（12）United States Patent
Dahlen

(10) Patent No.: US 9,474,071 B2
(45) Date of Patent: Oct. 18, 2016

(54) APPARATUS AND A METHOD FOR SELECTING A FREQUENCY BAND IN A MOBILE COMMUNICATION SYSTEM

(71) Applicant: TeliaSonera AB, Stockholm (SE)

(72) Inventor: Anders Dahlen, Vasterhaninge (SE)

(73) Assignee: TELIASONERA AB, Stockholm (SE)

( * ) Notice: Subject to any disclaimer, the term of this patent is extended or adjusted under 35 U.S.C. 154(b) by 275 days.

(21) Appl. No.: 14/104,436

(22) Filed: Dec. 12, 2013

(65) Prior Publication Data

US 2014/0162669 A1  Jun. 12, 2014

(30) Foreign Application Priority Data

Dec. 12, 2012 (EP) .................................... 12196740

(51) Int. Cl.
*H04W 72/00* (2009.01)
*H04W 72/04* (2009.01)
*H04W 48/18* (2009.01)

(52) U.S. Cl.
CPC ......... *H04W 72/0453* (2013.01); *H04W 48/18* (2013.01)

(58) Field of Classification Search
CPC ........... H04W 24/10; H04W 72/0453; H04W 72/048; H04W 36/30; H04W 36/22; H04W 36/04; H04W 48/02; H04W 36/18; H04W 72/10; H04W 72/1231
USPC .......... 455/450–454, 436–444; 370/329–334
See application file for complete search history.

(56) References Cited

U.S. PATENT DOCUMENTS

| | | | |
|---|---|---|---|
| 8,868,073 B2 | 10/2014 | Suzuki et al. | |
| 2006/0143206 A1* | 6/2006 | Lock | G06F 17/30961 |
| 2009/0093232 A1* | 4/2009 | Gupta | H04L 63/104 |
| | | | 455/410 |
| 2010/0110890 A1 | 5/2010 | Rainer et al. | |
| 2011/0176424 A1 | 7/2011 | Yang et al. | |
| 2012/0157100 A1 | 6/2012 | Suzuki et al. | |
| 2014/0366929 A1 | 12/2014 | Blau | |
| 2015/0043455 A1* | 2/2015 | Miklos | H04W 8/26 |
| | | | 370/329 |

FOREIGN PATENT DOCUMENTS

| | | |
|---|---|---|
| EP | 1519607 | 3/2005 |
| EP | 2237610 | 10/2010 |
| EP | 2451220 | 5/2012 |
| WO | 2009149600 | 12/2009 |
| WO | 2011107886 | 9/2011 |

OTHER PUBLICATIONS

European Patent Communication, dated Mar. 31, 2015, in corresponding European Patent Application No. 12 196 740.0.

(Continued)

*Primary Examiner* — Allahyar Kasraian
(74) *Attorney, Agent, or Firm* — Young & Thompson

(57) ABSTRACT

The invention relates to a method and apparatus. In the method, an apparatus, for example, a base station, receives radio interface capabilities from a mobile node. The apparatus receives a subscriber frequency band priority profile identifier from a mobility management entity node. The apparatus finds an entry from a frequency band priority data structure using the subscriber frequency band priority profile identifier and the at least one radio interface capability and obtaining at least one frequency band priority from the entry. The apparatus applies the at least one frequency band priority to control the mobility of the mobile node.

17 Claims, 4 Drawing Sheets

(56) References Cited

OTHER PUBLICATIONS

European search report, dated May 28, 2013, in corresponding European Patent Application No. 12 196 740.0.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; 3GPP Standard; 3GPP TS 36.300, 3rd Generation Partnership Project (3GPP), Mobile Competence Centre; No . V10.3.0, Apr. 5, 2011, pp. 1-197.

* cited by examiner

APPARATUS AND A METHOD FOR SELECTING A FREQUENCY BAND IN A MOBILE COMMUNICATION SYSTEM

BACKGROUND OF THE INVENTION

1. Field of the Invention

The invention relates to mobile communications networks, multi system end-user devices, and an apparatus and a method for selecting a frequency band in a mobile communication system.

2. Description of the Related Art

The field of data communications has been in turmoil during the recent years. New technologies are being introduced while old technologies are still in active use in mobile communication networks. Long-Term Evolution (LTE) standardized by the 3G Partnership Project (3GPP) represents a significant leap forward in wireless mobile communication systems. One of the main objectives of the LTE is the providing of downlink data rates of at least 100 Mbps and uplink date rates of at least 50 Mbps. LTE is not going to replace older technologies for years to come. Instead, LTE networks are going to co-exist with 3G networks and 2G networks. Especially, circuit switched voice services may be provided over 3G and 2G network via the circuit switched fallback service. LTE specifications enable radio access networks to indicate to mobile nodes different priorities for different radio technologies. Currently, the priorities for different radio technologies are determined based on user subscription. For example, the users that subscribe to a premium profile involving the use of 4G bitrates may never be assigned radio resources from a 3G or a 2G network where a 4G radio cell is available. LTE networks undergo constant evolution in terms of the air interface between a mobile node and an Evolved Node B, that is, an LTE base station. New air interface features emerge and may be deployed in different frequency bands. The new air interface features and technologies place requirements for mobile nodes. They require new capabilities of mobile nodes so that mobile nodes may harness the new air interface features.

It would be beneficial to be able to prioritize different frequency bands not only based on the user subscriptions, but also based on mobile nodes.

SUMMARY OF THE INVENTION

According to an aspect of the invention, the invention is a method, comprising: receiving, by an apparatus, information on at least one radio interface capability of a mobile node; receiving, by the apparatus, a subscriber frequency band priority profile identifier from a core network node, the subscriber frequency band priority profile identifier being associated with a mobile subscriber of the mobile node; finding, in the apparatus, an entry from a frequency band priority data structure by using the subscriber frequency band priority profile identifier and the at least one radio interface capability; obtaining, in the apparatus, at least one frequency band priority from the entry; and using, in the apparatus, the at least one frequency band priority to control at least one of target cell and frequency band selection of the mobile node.

According to a further aspect of the invention, the invention is an apparatus comprising at least one processor and at least one memory including computer program code, the at least one memory and the computer program code configured to, with the at least one processor, cause the apparatus at least to perform: receiving information on at least one radio interface capability of a mobile node; receiving, by the apparatus, a subscriber frequency band priority profile identifier from a core network node, the subscriber frequency band priority profile identifier being associated with a mobile subscriber of the mobile node; finding an entry from a frequency band priority data structure by using the subscriber frequency band priority profile identifier and the at least one radio interface capability; obtaining at least one frequency band priority from the entry; and using the at least one frequency band priority to control at least one of target cell and frequency band selection of the mobile node.

According to a further aspect of the invention, the invention is a base station, eNodeB, a radio network controller or a base station controller comprising the apparatus.

According to a further aspect of the invention, the invention is an apparatus comprising: means for receiving, by an apparatus, information on at least one radio interface capability of a mobile node; means for receiving, by the apparatus, a subscriber frequency band priority profile identifier from a core network node, the subscriber frequency band priority profile identifier being associated with a mobile subscriber of the mobile node; means for finding, in the apparatus, an entry from a frequency band priority data structure by using the subscriber frequency band priority profile identifier and the at least one radio interface capability; means for obtaining, in the apparatus, at least one frequency band priority from the entry; and means for using, in the apparatus, the at least one frequency band priority to control at least one of target cell and frequency band selection of the mobile node.

According to a further aspect of the invention, the invention is a base station, eNodeB, RNC or BSC comprising the apparatus.

According to a further aspect of the invention, the invention is a computer program comprising code adapted to cause the following when executed on a data-processing system: receiving, by an apparatus, information on at least one radio interface capability of a mobile node; receiving, by the apparatus, a subscriber frequency band priority profile identifier from a core network node, the subscriber frequency band priority profile identifier being associated with a mobile subscriber of the mobile node; finding, in the apparatus, an entry from a frequency band priority data structure by using the subscriber frequency band priority profile identifier and the at least one radio interface capability; obtaining, in the apparatus, at least one frequency band priority from the entry; and using, in the apparatus, the at least one frequency band priority to control at least one of target cell and frequency band selection of the mobile node.

According to a further aspect of the invention, the invention is a computer program product comprising the computer program.

In one embodiment of the invention, the at least one radio interface capability is associated with a certain supported frequency band and/or a certain supported radio access technology.

In one embodiment of the invention, the at least one radio interface capability is associated with a certain supported frequency band and radio access technology, or at least one of a certain supported radio access technology, of a mobile node.

In one embodiment of the invention, the at least one radio interface capability is associated with at least one supported radio access technology.

In one embodiment of the invention, the control of target cell or frequency band selection comprises issuing at least one instruction to the mobile node, from the base station, as to what target cell or frequency band to use. The at least one frequency band priority may be used by the base station to select among at least one candidate frequency band or target cell. The at least one candidate frequency band or target cell may be determined by the base station from measurement reports from at least one mobile node, for example, the mobile node.

In one embodiment of the invention, the subscriber frequency band priority profile identifier received from the core network node is obtained to the apparatus in response to the apparatus providing to the core network node an identifier of the mobile subscriber.

In one embodiment of the invention, by a frequency band may be meant at least one physical frequency range or at least one carrier, which may have associated with it a specific radio technology.

In one embodiment of the invention, the at least one radio interface capability may be received from at least one of a mobile node, core network node, a radio node, a base station, a radio network controller, a base station controller, and a radio access network node.

In one embodiment of the invention, the step of using the at least one frequency band priority to control at least one of target cell and frequency band selection of the mobile node comprises using the at least one frequency band priority in the apparatus to select a frequency band among at least two candidate frequency bands when determining target cell or carrier frequency at network controlled mobility messages sent to the mobile node, or using the at least one frequency band priority to select a frequency band among at least two candidate frequency bands for measurement configurations sent to the mobile node, or indicating the at least one frequency band priority to the mobile node.

In one embodiment of the invention, the step of using the at least one frequency band priority to control at least one of target cell and frequency band selection of the mobile node comprises using the at least one frequency band priority in the apparatus to select a frequency band among at least two candidate frequency bands; using the selected frequency band to determine at least one of target cell and frequency band in the apparatus; and indicating the at least one of target cell and frequency band to the mobile node.

In one embodiment of the invention, the step of using the at least one frequency band priority to control at least one of target cell and frequency band selection of the mobile node comprises using the at least one frequency band priority in the apparatus to select a frequency band among at least two candidate frequency bands; and indicating the selected frequency band in at least one measurement configuration request to the mobile node.

In one embodiment of the invention, the step of using the at least one frequency band priority to control at least one of target cell and frequency band selection of the mobile node comprises indicating the at least one frequency band priority to the mobile node. The mobile node may use the at least one frequency band priority to select a frequency band among at least two candidate frequency bands or to select a cell to camp on.

In one embodiment of the invention, the at least one frequency band priority comprises at least one of Evolved Universal Mobile Telecommunications System Radio Access Network priority, Universal Mobile Telecommunications System Radio Access Network priority, GSM/EDGE Radio Access Network priority. There may be separate priorities for E-UTRAN, UTRAN and GERAN.

In one embodiment of the invention, the step of finding the entry from the frequency band priority data structure comprises: obtaining a root pointer to the frequency band priority data structure; selecting a first pointer to a sub-tree in the frequency band priority data structure using the at least one radio interface capability and the root pointer; and selecting a second pointer to the entry in the sub-tree using the subscriber frequency band priority profile identifier. The frequency band priority data structure may be a table wherein table records may comprise pointers to other table records. The table may thus be seen as a tree structure. The at least one radio interface capability may be translated to a vector. The vector may be used to index pointers such as the first pointer to select the sub-tree. The vector may be used to select pointers from a list comprising pointers, the list comprising label values that are compared to the vector.

In one embodiment of the invention, the step of finding the entry from the frequency band priority data structure further comprises selecting a base index to the frequency band priority data structure using the at least one radio interface capability and the root pointer; and adding the subscriber frequency band priority profile identifier to the base index to obtain the entry. The at least one radio interface capability may be translated to a vector. The vector may be used to compute the base index. The vector may also be converted to a scalar value that is used as the base index.

In one embodiment of the invention, the step of finding the entry from the frequency band priority data structure comprises forming a numeric value using the at least one radio interface capability. The numeric value may be used to select a correct table, sub-tree or table portion in which the subscriber frequency band priority profile identifier may be used to find the entry.

In one embodiment of the invention, the step of finding the entry from the frequency band priority data structure comprises forming a vector using the at least one radio interface capability, the vector comprising a vector element for each radio interface capability, the radio interface capabilities having predefined code values. The vector may be converted to a scalar value. The vector may be a bit vector. The vector or the scalar value may be used to select a correct table, sub-tree or table portion in which the subscriber frequency band priority profile identifier may be used to find the entry.

In one embodiment of the invention, the apparatus comprises at least one of a base station, a base station server, an evolved base station node, an RNC, a BSC and a chipset.

In one embodiment of the invention, the at least one radio interface capability comprises at least one of support for carrier aggregation of certain supported frequency carriers, support for frequency band aggregation of certain supported frequency bands, support for single user multiple input multiple output (SI-MIMO) in a certain supported radio access technology, support of multi flow in UTRAN, support of multi user multiple input multiple output (MU-MIMO) of a certain supported radio access technology, support of coordinated multi point (COMP) of EUTRAN, support for automatic neighbor relation (ANR) in a certain supported radio access technology, support for device-to-device communication in a certain supported radio technology. The radio interface capability may be a an indicator of a certain supported standardization radio release that imply that certain radio features are supported or it may be a so called feature group indicator which indicates that a certain mandatory feature is supported and has been tested.

In one embodiment of the invention, the subscriber frequency band priority profile identifier is a subscriber profile identifier for radio access technology and frequency priority or a QoS parameter like aggregated maximum bit rate.

In one embodiment of the invention, the mobile node comprises at least one of a handset, a chipset, a mobile device and a mobile terminal.

In one embodiment of the invention, a frequency band comprises at least one frequency range.

In one embodiment of the invention, the apparatus comprises at least one of a Long-Term Evolution (LTE) Evolved Node B, a Base Transceiver Station (BTS), a Node B, Radio Network Controller (RNC), a Base Station Controller (BSC).

In one embodiment of the invention, the at least one processor of the apparatus, for example, of the base station, RNC, or BSC may be configured to perform any of the method steps disclosed hereinabove.

In one embodiment of the invention, the transmission and reception steps may be performed by at least one radio frequency circuit.

In one embodiment of the invention, the base station comprises an OFDMA radio network node or an SC-FDMA radio network node or a WCDMA network node.

In one embodiment of the invention, the at least one Radio Frequency (RF) circuit in the mobile node may also be referred to as at least one circuit.

In one embodiment of the invention, the at least one Radio Frequency (RF) circuit in the base station node may also be referred to as at least one circuit.

In one embodiment of the invention, the mobile node such as a User Equipment (UE) comprises a mobile station or generally a mobile terminal. In one embodiment of the invention a user of a mobile terminal is identified using a subscriber module, for example, User Services Identity Module (USIM) or a Subscriber Identity Module (SIM). The combination of Mobile Equipment (ME) and a subscriber module may be referred to as a mobile subscriber. A mobile subscriber may be identified using an IMSI. An IP address may be allocated or associated with a mobile subscriber.

In one embodiment of the invention, the apparatus is a semiconductor circuit, a chip or a chipset.

In one embodiment of the invention, the base station node is configured to be used in a 4G system such as, for example, LTE Evolved Packet System (EPS).

In one embodiment of the invention, the computer program is stored on a computer readable medium. The computer readable medium may be, but is not limited to, a removable memory card, a removable memory module, a magnetic disk, an optical disk, a holographic memory or a magnetic tape. A removable memory module may be, for example, a USB memory stick, a PCMCIA card or a smart memory card.

The embodiments of the invention described hereinbefore may be used in any combination with each other. Several of the embodiments may be combined together to form a further embodiment of the invention. A method, a base station, an eNodeB, an RNC, a BSC, an apparatus, a computer program or a computer program product to which the invention is related may comprise at least one of the embodiments of the invention described hereinbefore.

It is to be understood that any of the above embodiments or modifications can be applied singly or in combination to the respective aspects to which they refer, unless they are explicitly stated as excluding alternatives.

The benefits of the invention is related to control or steer the UE to a RAT or frequency such that UEs get service in the RAT/frequency that best matches UE capabilities and subscription profile.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
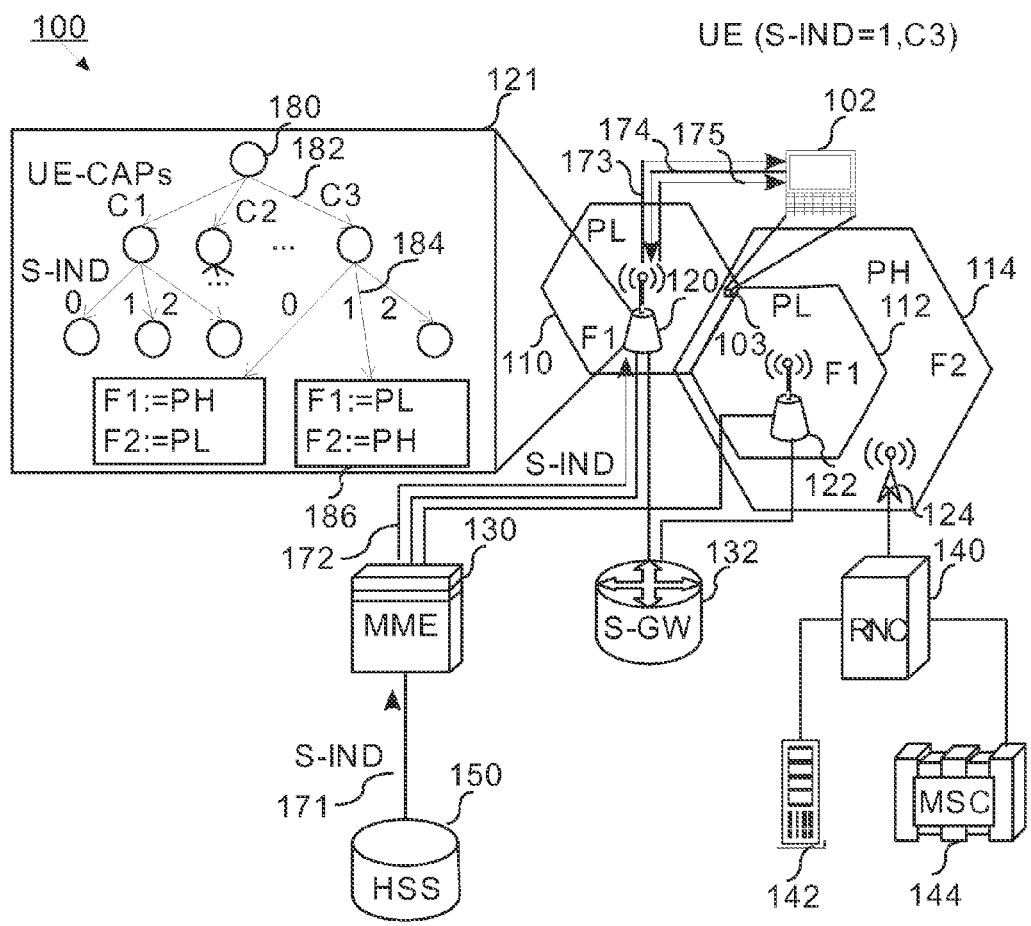
FIG. 1 is a block diagram illustrating a radio access network where at least one frequency band priority is determined in a base transceiver station based on at least one mobile node capability and at least one frequency band prioritization index in one embodiment of the invention.

FIG. 1 is a block diagram illustrating a radio access network where at least one frequency band priority is determined in a base transceiver station, in short a base station based on at least one mobile node capability and at least one frequency band prioritization index in one embodiment of the invention. In one embodiment of the invention, the radio access network is an Evolved UMTS Radio Access Network (EUTRAN) and the base station is an Evolved Node B (eNB).

In FIG. 1 there are illustrated three cells, namely, a cell 110 and a cell 112. Cells 110-112 represent cells of a first frequency band F1. The first frequency band may be, for example, a frequency band within an LTE frequency band, that is, an Evolved Universal Mobile Telecommunications System Radio Access Network (E-UTRAN) frequency band. A cell 114 represents a cell of a second frequency band F2. The second frequency band may be, for example, a frequency band within a Universal Mobile Telecommunications System or a Global System of Mobile (GSM) Telecommunications frequency band. Cell 110 is provided by a base station 120. A part of a memory of base station 120 is illustrated with box 121. Cell 112 is provided by a base station 122, whereas cell 114 is provided by a base station 124. Base stations 120 and 122 may be EUTRAN eNBs, whereas base station 124 may be a UTRAN Node B. Base station 120 may be communicatively connected to a Mobility Management Entity (MME) 130 and a Serving Gateway (S-GW) 132. MME 130 may be communicatively connected to a Home Subscriber Server (HSS) 150. Base station 124 may be communicatively connected to an RNC 140 and via RNC 140 to a Serving GPRS Support Node (SGSN) 142 and a Mobile Switching Centre (MSC) 144. In FIG. 1 there is also illustrated a mobile node 102, which may support LTE. The mobile node may be, therefore, an LTE User Equipment (UE). Mobile node 102 may be a dual system mobile node that supports multiple radio access technologies such as LTE, UMTS and GSM.

The starting point in FIG. 1 is that mobile node 102 is in the area of cell 110. However, cells 112 and 114 may provide a sufficient radio signal level. Mobile node 102 may perform a network attach via base station 120. Base station 120 obtains, for example, from MME 130, a profile identifier (S-IND), as illustrated with arrow 172. The profile identifier may be called a subscriber frequency band priority profile identifier. The profile identifier (S-IND) is associated with a user of the mobile node 102. The profile identifier (S-IND)

may be received to MME 130 from HSS 150 based on an identifier of the user of mobile node 102, as illustrated with arrow 171. The identifier of the user of mobile node 102 may be an International Mobile Subscriber Identity (IMSI) or a temporary identity as, for example, a GUTI, a TMSI or a P-TMSI. The base station may perform a UE capability enquiry to the mobile, and the mobile responds with radio interface capability (C3). After receiving the profile identifier and radio interface capability, base station 120 may start determining the at least one frequency band priority. The determination is carried out by base station 120 using a memory 121 associated with base station 120. The determination is performed on the basis of the at least one radio interface capability (C3) and the profile identifier (S-IND). The at least one frequency band priority determined by base station 120 may be used in the base station 120 to select a frequency band among at least two candidate frequency bands when determining target cell or carrier frequency at network controlled mobility messages sent to mobile node 102. The at least one frequency band priority determined by base station 120 may be used in the base station 120 to select a frequency band among at least two candidate frequency bands for measurement configurations sent to the mobile node. In FIG. 1 base station 120 may assign low priority for cells 110 and 112, as indicated with letters "PL", and high priority for cell 114, as indicated with letters "PH".

Returning now to the point when base station 120 has determined the at least one frequency band priority, base station may use the at least one frequency band priority to control at least one of target cell and frequency band selection for mobile node 102. Mobile node 102 is in geographic location 103 where it may be assumed that cells 110, 112 and 114 provide a sufficient signal levels to serve mobile node 102. The signal levels for cells 110, 112 and 114 may be reported by mobile node 102 to base station 120 in a plurality of measurement reports (not shown). Base station 120 may use the at least one frequency band priority for the selection of a frequency band among at least two candidate frequency bands. Base station 120 may indicate the selected frequency band in at least one measurement configuration request to mobile node 102, as illustrated with arrow 173. Based on the at least one measurement configuration request mobile node 102 performs at least one radio measurement and returns at least one measurement result to base station 120, as illustrated with arrow 174. Based on the at least one measurement result, base station 120 may decide whether to issue a request to mobile node 102 to use the frequency band selected by base station 120 before the performing of the at least one measurement. In FIG. 1 base station 120 may issue the request to mobile node 102 to use the frequency band selected by the base station 120, as illustrated with arrow 175.

In one embodiment of the invention, the at least one frequency band priority is used in base station 120 to select a frequency band among at least two candidate frequency bands. The selected frequency band is used to determine at least one of target cell and frequency band in the base station 120. Thereupon, the at least one of target cell and frequency band is indicated to mobile node 102 in a message for network controlled mobility. For example, mobile node 102 may report a plurality of radio measurements to base station 120 regarding cells 110, 112 and 114. Based on the plurality of radio measurements, base station 120 forms the least two candidate frequency bands. Base station 120 performs the determination of the at least one of target cell and frequency band. The determination is based on the at least one frequency band priority, and may also be based on at least one of traffic load situations in cells 110, 112 and 114 and radio signal level provided by cells 110, 112 and 114.

In one embodiment of the invention, base station 120 may provide the at least one frequency band priority to mobile node 102. At least one fixed frequency band priority may also be related to at least one frequency band in mobile node 102. Mobile node 102 may assign low priority for cells 110 and 112, as indicated with letters "PL", and high priority for cell 114, as indicated with letters "PH". For example, when mobile node 102 moves to a geographic location within the footprints of cells 112 and 114, mobile node prefers cell 114 to cell 112, provided that the radio quality of cell 114 remains above a predefined threshold level. This is due to the higher priority related to the frequency band of cell 114. The higher priority was obtained by mobile node 102 in cell 110 from base station 120.

In one embodiment of the invention, at least one processor of the base station 120 determines the at least one frequency band priority so that the at least one processor determine a root pointer 180 of a data structure for the determination of the at least one frequency band priority. Starting from root pointer 180 a first pointer 182 is selected to a sub-tree assigned for the at least one radio interface capability (C3). The selection is performed by using the at least one radio interface capability. First pointer 182 may be selected, for example, so that a key indicating the at least one radio interface capability is associated with first pointer 182. The at least one radio interface capability and the key indicating the at least one radio interface capability may be encoded, for example, so that different bits or multibit fields in a bit vector are assigned for the different capabilities among the at least one radio interface capability. After the sub-tree for the at least one radio interface capability (C3) has been selected, a second pointer 184 is selected by using the profile identifier. Second pointer 184 may be selected, for example, so that a key indicating the profile identifier is associated with second pointer 184. Second pointer may point to a field storing the at least one frequency band priority. In FIG. 1 frequency band F1 is assigned low priority (PL), whereas frequency band F2 is assigned high priority (PH).

In one embodiment of the invention, at least one processor of base station 120 uses the at least one radio interface capability (C3) to determine a base index to a table that stores frequency band priorities selected based on the profile identifier. The base index is added to the profile identifier to obtain an index to select the at least one frequency band priority. The at least one radio interface capability may be first encoded, for example, so that different bits or multi-bit fields in a bit vector are assigned for the different capabilities among the at least one radio interface capability. The base index may be selected based on the bit vector value.

In one embodiment of the invention, the profile identifier (S-IND) may be provided to RNC 140. RNC 140 may obtain the at least one frequency band priority as illustrated in FIG. 1 for base station 120. The communication between mobile node 102 and RNC 140 is then performed via Node B 124. Similarly, the profile identifier (S-IND) may be provided to a GSM Base Station Controller (BSC) which may obtain the at least one frequency band priority as illustrated in FIG. 1 for base station 120.

Figure 2:
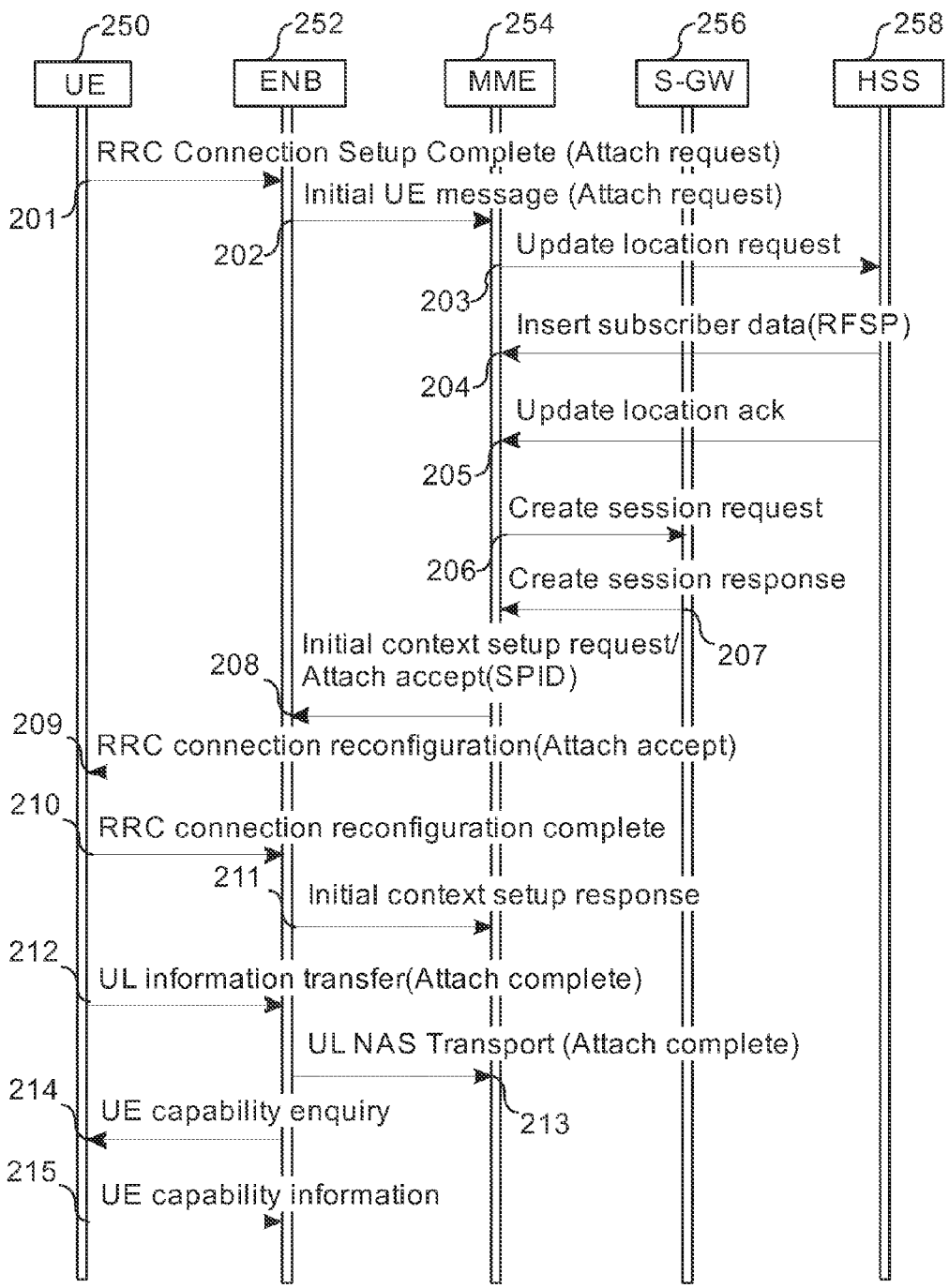
FIG. 2 is a message sequence chart that illustrates a network attach in one embodiment of the invention.

FIG. 2 is a message sequence chart that illustrates a network attach in one embodiment of the invention.

In FIG. 2 there is shown a mobile node 250, that is, a User Equipment (UE). Mobile node 250 is served by a base station 252, for example, an Evolved Node B (ENB). Base station 252 communicates with a Mobility Management Node, for example, a Mobility Management Entity (MME)

254. Base station 252 may communicate with a gateway node 256, for example, a Serving Gateway (S-GW) 256. The location of mobile node 250 is stored in a subscriber database 258, for example, a Home Subscriber Server (HSS) 258.

The starting point in FIG. 2 is that mobile node 250 establishes RRC connection and sends RRC Connection Setup Complete message that contains an attach request message to ENB 252, as illustrated with arrow 201. Mobile node 250 may have been powered on in the footprint of a cell provided by ENB 252.

ENB 252 sends Initial UE message containing the received attach request message to MME 254, as illustrated with arrow 202. The attach request message to MME 254 comprises an identifier of a user of mobile node 250. In response, MME 254 sends an update location request message to HSS 258, as illustrated with arrow 203. HSS 258 uses the identifier of the user to obtain subscriber data for the user. The subscriber data comprises a profile identifier for at least one frequency band priority. The profile identifier may also be called an index to RAT/Frequency Selection Priority (RFSP). HSS 258 provides the profile identifier to MME 254, for example, in an insert subscriber data message, as illustrated with arrow 204. HSS acknowledges the location update to MME 254, as illustrated with arrow 205. Thereupon, MME 254 may send a create session request to S-GW 256, as illustrated with arrow 206. S-GW 256 sends in response a create session response message to MME 254, as illustrated with arrow 207. Thereupon, MME 254 sends an initial context setup request containing an attach accept to ENB 252, thereby providing the profile identifier to ENB 252, as illustrated with arrow 208. ENB 252 sends an RRC connection reconfiguration message to mobile node 250, as illustrated with arrow 209. Mobile node 250 sends an RRC connection reconfiguration complete message to ENB 252, as illustrated with arrow 210. The profile identifier may be referred to as Subscriber Profile ID (SPID) in radio access network. ENB 252 sends an initial context setup response message to MME 254, as illustrated with arrow 211. Thereupon, mobile node 250 sends an UL Information Transfer message containing an attach complete message to ENB 252, as illustrated with arrow 212. ENB 252 sends an UL NAS Transport message containing the attach complete message to MME 254, as illustrated with arrow 213. ENB sends UE capability enquiry message to the mobile node 250 and the mobile node 250 replies with a UE capability information message, as illustrated with arrows 214 and 215, respectively. The UE capability information message comprises at least one radio interface capability of the mobile node 250. Upon receiving the radio interface capability, ENB 252 may use the at least one radio interface capability of mobile node 250 to determine a starting point for the determination of at least one frequency band priority based on the profile identifier. Thereupon, from the starting point ENB 252 may use the profile identifier to find an entry comprising at least one frequency band priority. Alternatively, the ENB 252 may use the profile identifier as a starting point for the determination of at least one frequency band priority based on the at least one radio interface capability of mobile node 250. Thereupon, from the starting point ENB 252 may use the at least one radio interface capability to find an entry comprising at least one frequency band priority. From the entry ENB 252 obtains the at least one frequency band priority. The at least one frequency band priority is provided by ENB 252 to mobile node 250 in a Radio Resource Control (RRC) message, for example, in a connection release message.

The embodiments of the invention described hereinbefore in association with FIGS. 1 and 2 may be used in any combination with each other. Several of the embodiments may be combined together to form a further embodiment of the invention.

Figure 3:
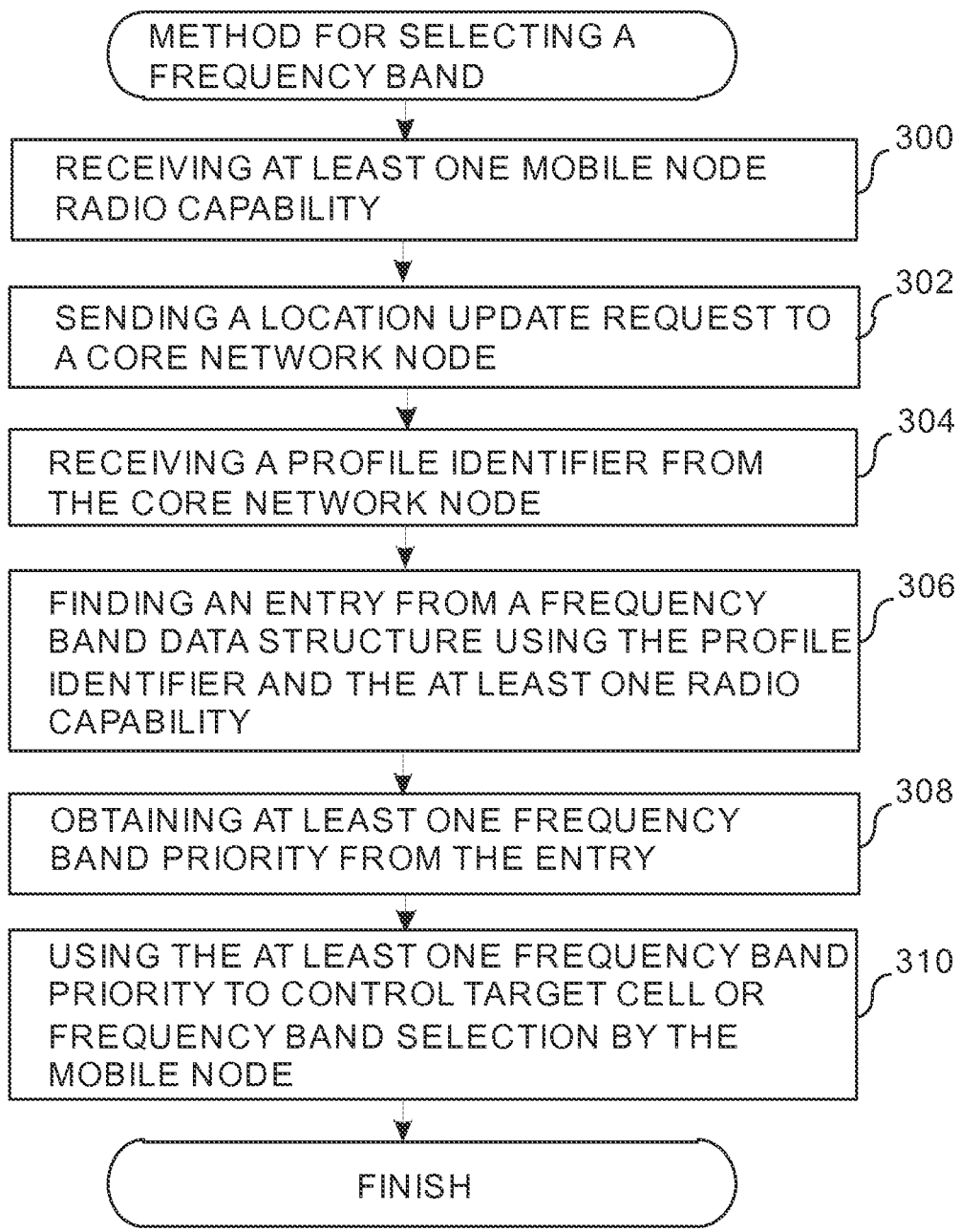
FIG. 3 is a flow chart illustrating a method for frequency band selection in one embodiment of the invention.

FIG. 3 is a flow chart illustrating a method for frequency band selection in one embodiment of the invention.

At step 300 a base station receives information on at least one radio capability from a mobile node. The at least one radio capability may be received in a RRC connection establishment, UE capability enquiry procedure, location updating, network attachment or registration message. Alternatively, a base station receives at least one radio capability from a source radio node (eNB, RNC, BSC) at handover or from core network (MME, SGSN) if for example already attached and some base station has stored radio capabilities in core network node after previous UE capability enquiry. The message may also comprise an identifier of the user, that is, the subscriber associated with the mobile node.

At step 302 the base station sends a location update request to a core network node, for example, a Mobility Management Entity (MME) of a core network. The location update request may comprise an identifier of the user of the mobile node.

At step 304 the base station node receives a profile identifier associated with the user of the mobile node.

At step 306 the base station finds an entry from a frequency band priority data structure using the profile identifier and the at least one radio interface capability.

At step 308 the base station obtains at least one frequency band priority from the entry.

At step 310 the base station uses the at least one frequency band priority to control at least one of target cell and frequency band selection of the mobile node. The control of target cell or frequency band selection may comprise issuing instructions to the mobile node, from the base station, as to what target cell or frequency band to use. The at least one frequency band priority may be used by the base station to select among at least one candidate frequency bands or target cells.

The embodiments of the invention described hereinbefore in association with FIGS. 1, 2 and 3 may be used in any combination with each other. Several of the embodiments may be combined together to form a further embodiment of the invention.

When embodiments of the invention described hereinbefore are applied in WCDMA (UTRAN, 3G) the base station is RNC and the mobility management entity is the Serving GPRS Support Node (SGSN). When embodiments of the invention described hereinbefore are applied in GERAN or GSM (2G) the base station is BSC and the mobility management entity is the SGSN. In these systems UE capabilities may be received from the UE by other means than an enquiry.

Figure 4:
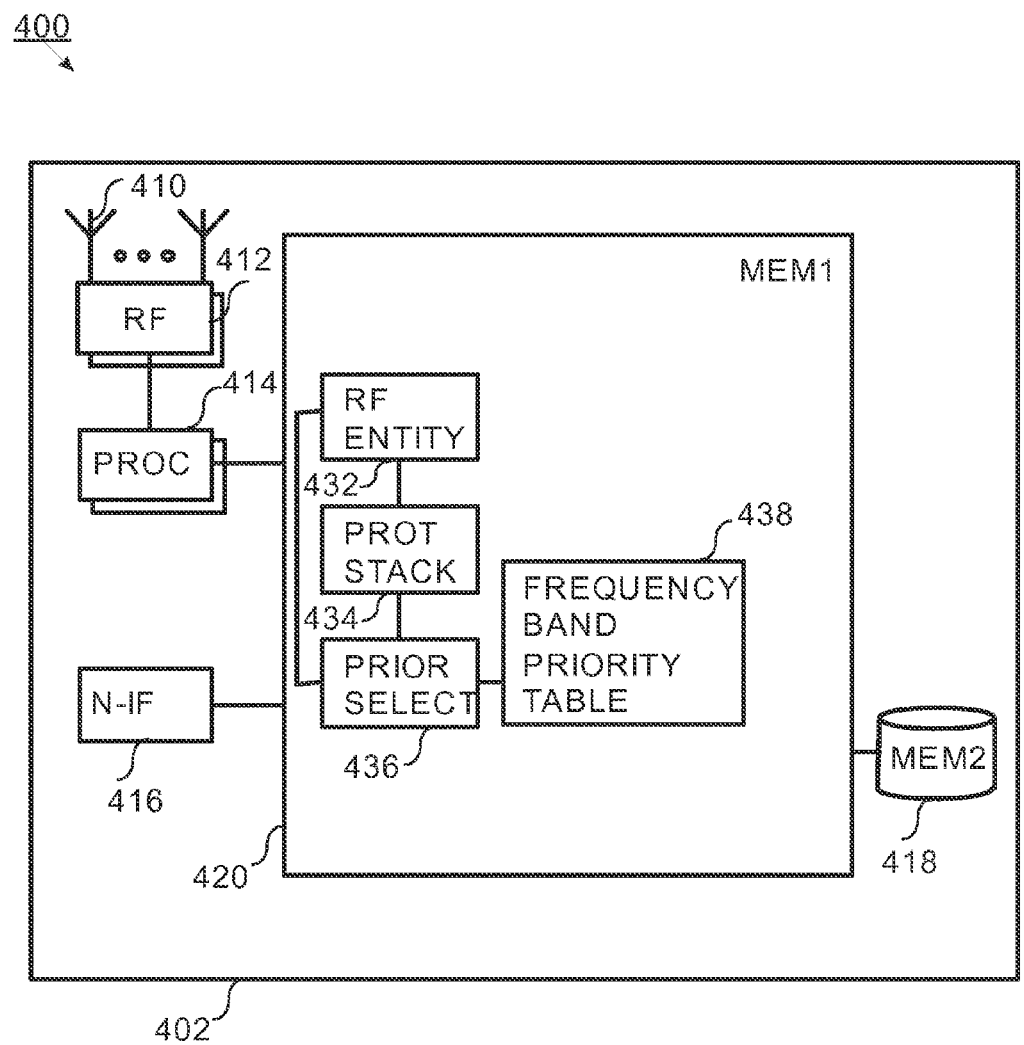
FIG. 4 is a block diagram illustrating an apparatus in one embodiment of the invention.

FIG. 4 is a block diagram illustrating an apparatus in one embodiment of the invention. In FIG. 4 there is an apparatus 400, which is, for example, a wireless access point, a base station, a base transceiver station, an evolved node B, an RNC, a BSC, an Application Specific Integrated Circuit (ASIC), a chip or a chipset. Apparatus 400 may correspond to a base station illustrated in FIGS. 1, 2 and 3. The internal functions of apparatus 400 are illustrated with a box 402. Apparatus 400 may comprise at least one antenna 410. There may be multiple input and output antennas. In association with apparatus 400 there is at least one Radio Frequency (RF) circuit 412. RF circuit 412 may be also any circuit or may be referred to as circuit 412 or circuitry 412. RF circuit 412 may also comprise a baseband circuit 412. RF circuit 412 is communicatively connected to at least one processor 414. Connected to the at least one processor 414 there may be a first memory 420, which is, for example, a Random Access Memory (RAM). There may also be a second memory 418, which may be a non-volatile memory, for example, an optical or magnetic disk. There is also a network interface 416 which may comprise an interface card for connecting to a remote network node, for example, a Mobility Management Entity (MME) node. In memory 420 there may be stored software relating to functional entities 432, 434 and 436.

A protocol stack entity 434 communicates via an RF entity 432 with the at least one RF circuit 414 to perform signaling towards a mobile node and user data transmission and reception to/from the mobile node. A priority selection entity uses at least one radio interface capability from a mobile node and a profile index associated with the user of the mobile node to select an entry from a frequency band priority table 438. The entry comprises at least one frequency band priority, which may be provided to protocol stack entity 434 for signaling to the mobile node.

RF circuit 412 may comprise a transmitter for SC-FDMA and a receiver and a transmitter for OFDMA. RF circuit 412 may also comprise a receiver for SC-FDMA. RF circuit 412 may also comprise a transmitter and a receiver circuit for WLAN transmission or reception. As used in this application, the term 'circuitry' and 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

When the at least one processor 414 executes functional entities associated with the invention, memory 420 comprises entities such as, any of the functional entities 432, 434 and 436. The functional entities within apparatus 400 illustrated in FIG. 4 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The functional entities may be implemented as separate computer programs or as a single computer program comprising several routines or functions implementing the entities. The program blocks are stored on at least one computer readable medium such as, for example, a memory circuit, memory card, magnetic or optical disk. Some functional entities may be implemented as program modules linked to another functional entity. The functional entities in FIG. 4 may also be stored in separate memories and executed by separate processors, which communicate, for example, via a message bus or an internal network within the network node. An example of such a message bus is the Peripheral Component Interconnect (PCI) bus.

The embodiments of the invention described hereinbefore in association with FIGS. 1, 2 and 3 or the summary of the invention may be used in any combination with each other. Several of the embodiments may be combined together to form a further embodiment of the invention.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 2G communications network, 3G communications networks, 4G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices, or one or more software entities such as modules.

The exemplary embodiments can store information relating to various processes described herein. This information can be stored in one or more memories, such as a hard disk, optical disk, magneto-optical disk, RAM, and the like. One or more databases can store the information regarding cyclic prefixes used and the delay spreads measured. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of one or more application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The embodiments of the invention described hereinbefore in association with the figures presented and the summary of the invention may be used in any combination with each other. Several of the embodiments may be combined together to form a further embodiment of the invention.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
   receiving, by an apparatus, information on at least one radio interface capability of a mobile node;
   receiving, by the apparatus, a subscriber frequency band priority profile identifier from a core network node, the subscriber frequency band priority profile identifier being associated with a mobile subscriber of the mobile node;
   using, in the apparatus, both the subscriber frequency band priority profile identifier and the at least one radio interface capability to retrieve an entry from a frequency band priority data structure;
   obtaining, in the apparatus, at least one frequency band priority from the retrieved entry based on both the subscriber frequency band priority profile identifier and the at least one radio interface capability; and
   using, in the apparatus, the at least one frequency band priority to control at least one of target cell and frequency band selection of the mobile node.

2. The method according to claim 1, wherein the step of using the at least one frequency band priority to control at least one of target cell and frequency band selection of the mobile node further comprises:
   using the at least one frequency band priority in the apparatus to select a frequency band among at least two candidate frequency bands;
   using the selected frequency band to determine at least one of target cell and frequency band in the apparatus; and
   indicating the at least one of target cell and frequency band to the mobile node.

3. The method according to claim 1, wherein the step of using the at least one frequency band priority to control at least one of target cell and frequency band selection of the mobile node further comprises:
   using the at least one frequency band priority in the apparatus to select a frequency band among at least two candidate frequency bands; and
   indicating the selected frequency band in at least one measurement configuration request to the mobile node.

4. The method according to claim 1, wherein the step of using the at least one frequency band priority to control at least one of target cell and frequency band selection of the mobile node further comprises:
   indicating the at least one frequency band priority to the mobile node.

5. The method according to claim 4, the method further comprising:
   using the at least one frequency band priority in the mobile node to select a frequency band among at least two candidate frequency bands.

6. The method according to claim 1, the method further comprising:
   determining that the mobile node is roaming outside home network; and
   assigning a default roamer subscriber frequency band priority profile identifier for the mobile node to be used instead of the subscriber frequency band priority profile identifier.

7. The method according to claim 1, wherein the at least one frequency band priority comprises at least one of Evolved Universal Mobile Telecommunications System Radio Access Network priority, Universal Mobile Telecommunications System Radio Access Network priority, GSM/EDGE Radio Access Network priority.

8. The method according to claim 1, wherein retrieving the entry from the frequency band priority data structure further comprises:
   obtaining a root pointer to the frequency band priority data structure;
   using the at least one radio interface capability to select a first pointer to a sub-tree in the frequency band priority data structure that corresponds to the at least one radio interface capability and the root pointer; and
   using the subscriber frequency band priority profile identifier to select a second pointer to the entry in the sub-tree that corresponds to the subscriber frequency band priority profile identifier.

9. The method according to claim 1, wherein retrieving the entry from the frequency band priority data structure further comprises:
   selecting a base index to the frequency band priority data structure using the at least one radio interface capability and a root pointer; and
   adding the subscriber frequency band priority profile identifier to the base index to obtain the entry.

10. The method according to claim 1, wherein retrieving the entry from the frequency band priority data structure further comprises:
    forming a numeric value using the at least one radio interface capability.

11. The method according to claim 1, wherein retrieving the entry from the frequency band priority data structure further comprises:
    encoding, in a vector the at least one radio interface capability, the vector comprising a vector element for each radio interface capability, the radio interface capabilities having predefined code values.

12. The method according to claim 1, wherein the apparatus comprises at least one of a base station, a base station server, an evolved base station node, a radio network controller, a base station controller and a chipset.

13. The method according to claim 1, wherein the at least one radio interface capability comprises at least one of support for carrier aggregation of certain supported frequency carriers, support for frequency band aggregation of certain supported frequency bands, support for single user multiple input multiple output (SI-MIMO) in a certain supported radio access technology, support of multi flow in UTRAN, support of multi user multiple input multiple output (MU-MIMO) of a certain supported radio access technology, support of coordinated multi point (CoMP) of EUTRAN, support for automatic neighbor relation (ANR) in a certain supported radio access technology, support for device-to-device communication in a certain supported radio technology.

14. The method according to claim 1, wherein the subscriber frequency band priority profile identifier is a subscriber profile identifier for radio access technology and frequency priority or a Quality of Service (QoS) parameter, for example, aggregated maximum bit rate.

15. An apparatus comprising at least one processor and at least one memory including computer program code, the at least one memory and the computer program code configured to, with the at least one processor, cause the apparatus at least to perform:
    receiving information on at least one radio interface capability of a mobile node;
    receiving a subscriber frequency band priority profile identifier from a core network node, the subscriber frequency band priority profile identifier being associated with a mobile subscriber of the mobile node;
    using both the subscriber frequency band priority profile identifier and the at least one radio interface capability to retrieve an entry from a frequency band priority data structure;
    obtaining at least one frequency band priority from the retrieved entry based on both the subscriber frequency band priority profile identifier and the at least one radio interface capability; and
    using the at least one frequency band priority to control at least one of target cell and frequency band selection of the mobile node.

16. A communication system comprising:
    a mobile node configured to perform at least one of target cell and frequency band selection; and
    an apparatus at least one processor and at least one memory including computer program code, the at least one memory and the computer program code configured to, with the at least one processor, cause the apparatus at least to perform:
        receiving information on at least one radio interface capability of a mobile node,
        receiving a subscriber frequency band priority profile identifier from a core network node, the subscriber frequency band priority profile identifier being associated with a mobile subscriber of the mobile node,
        using both the subscriber frequency band priority profile identifier and the at least one radio interface capability to retrieve an entry from a frequency band priority data structure,
        obtaining at least one frequency band priority from the retrieved entry based on both the subscriber frequency band priority profile identifier and the at least one radio interface capability, and
        using the at least one frequency band priority to control at least one of target cell and frequency band selection of the mobile node.

17. A computer program recorded on a non-transitory recording medium comprising code adapted to cause the following when read and executed by a processor device of a data-processing system:
    receiving, by an apparatus, information on at least one radio interface capability of a mobile node;
    receiving, by the apparatus, a subscriber frequency band priority profile identifier from a core network node, the subscriber frequency band priority profile identifier being associated with a mobile subscriber of the mobile node;
    using, in the apparatus, both the subscriber frequency band priority profile identifier and the at least one radio interface capability to retrieve an entry from a frequency band priority data structure;
    obtaining, in the apparatus, at least one frequency band priority from the retrieved entry based on both the subscriber frequency band priority profile identifier and the at least one radio interface capability; and
    using, in the apparatus, the at least one frequency band priority to control at least one of target cell and frequency band selection of the mobile node.

* * * * *